United States Patent [19]

Just et al.

[11] Patent Number: 4,482,674

[45] Date of Patent: Nov. 13, 1984

[54] WATER-DILUTABLE BINDER, A PROCESS FOR ITS PREPARATION AND ITS USE

[75] Inventors: Christoph Just, Niedernhausen; Jürgen Ritz, Mainz; Rolf Zimmermann, Wiesbaden, all of Fed. Rep. of Germany

[73] Assignee: Hoechst Aktiengesellschaft, Fed. Rep. of Germany

[21] Appl. No.: 449,671

[22] Filed: Dec. 14, 1982

[30] Foreign Application Priority Data

Dec. 16, 1981 [DE] Fed. Rep. of Germany ....... 3149828

[51] Int. Cl.$^3$ .......................... C08L 7/00; C08L 9/00; C08L 15/00; C08L 75/00
[52] U.S. Cl. .................................. 525/124; 525/123; 524/507; 524/813
[58] Field of Search ................ 525/123, 124, 507, 813

[56] References Cited

U.S. PATENT DOCUMENTS

| | | | |
|---|---|---|---|
| 3,431,235 | 3/1969 | Lubowitz | 525/123 |
| 3,522,218 | 7/1970 | Pedain et al. | 525/123 |
| 3,582,508 | 6/1971 | McIntosh | 525/123 |
| 4,310,398 | 1/1982 | Gimpel et al. | 525/124 |

*Primary Examiner*—Allan M. Lieberman
*Attorney, Agent, or Firm*—Charles A. Muserlian

[57] ABSTRACT

A water-dilutable binder for coatings based on reaction products of diene polymers and poly-unsaturated polyfunctional amidoamines, which comprises (a) a cyclorubber, (b) a polyfunctional amidoamine which has been added to component (a) and is derived from reaction with a monomeric unsaturated fatty acid free from conjugated double bonds but having 12 to 18 carbon atoms or from its oligomers, and (c) a polyisocyanate which is bonded to component (b) and whose isocyanate groups which are not bonded to component (b) are blocked, a process for its preparation and its use for paints and coatings.

10 Claims, No Drawings

WATER-DILUTABLE BINDER, A PROCESS FOR ITS PREPARATION AND ITS USE

The anodic deposition of electropaints based on diene polymers, such as butadiene oils, is known. The resulting coatings are then crosslinked at elevated temperature and/or by oxidative polymerization. Crosslinking proceeds satisfactorily only when protons liberated at the anode remain in the deposited product, because these protons catalyze the crosslinking.

Cationic electropainting systems which are based on low-molecular weight methylbutadiene polymers are also known. These known products are obtained by Diels-Alder reaction with conjugated fatty acids, and they are not self-crosslinking. In order to crosslink the system melamine, urea or benzoguanidine derivatives are admixed as crosslinking agents. However, this is associated with the disadvantage that due to different migration rates of the individual components electrical deposition does not deposit the reactants involved in the hardening reaction evenly on the metal which is connected as the cathode, and the actual hardening reaction can thus not proceed homogeneously.

A further publication describes mixtures of an emulsifying cationic resin and a hydrocarbon which by itself is not dispersible in water. Even in this system there is the danger of non-uniform deposition of the components due to differing charge, and hence of the bath demixing.

Also known are mixtures of amine-containing organic polymers and fully blocked multifunctional isocyanate compounds as additional hardening component. In this case, it is a prerequisite for completely homogeneous crosslinking of the deposited film that electrical deposition of the two hardening components takes place completely uniformly even in respect of time. The differing chemical structure of the components can, in certain circumstances, lead to a differing electrical deposition tendency of the components, which must result in one of the two components becoming depleted or concentrated in the electrocoating bath.

It is an object of the present invention to develop binders which avoid the disadvantages of known products. In particular, it is intended to develop binders which are self-hardening and thus avoid the dangers of the deposit demixing during electrophoretic deposition.

The invention relates to a water-dilutable binder for surface coatings based on reaction products of diene polymers and polyunsaturated polyamidoamines, which comprises (a) a optionally phenol-containing-cyclorubber, (b) a polyfunctional amidoamine which has been added to component (a) and is derived from reaction with a monomeric unsaturated fatty acid without conjugated double bonds but having 12 to 18 carbon atoms or from its oligomers, and (c) a polyisocyanate which is bonded to component (b) and whose isocyanate groups which are not bonded to component (b) are blocked.

The invention thus relates to reaction products of a cyclorubber, i.e. of a starting substance which, compared to polydiene resins, contains a very small proportion of double bonds. This has the advantage that the binder according to the invention also contains only a small proportion of double bonds. Since in coatings obtained by cataphoresis these double bonds remain in the film even after hardening—since they are not opened up by anodically formed protons—coatings thus prepared surprisingly feature high oxidation stability. The blocked groups of the incorporated isocyanate also provide the binder with the functional groups necessary for crosslinking at elevated temperatures. Since, in addition, all components of the binder are bonded to one another within a molecular structure, the components must be deposited uniformly—even over a prolonged time period—at the cathode, because the amine groups give the molecule a positive charge. The bath does not therefore become depleted of a single component, nor demixed. Also, cathodic deposition is associated with the advantages of better throwing power and better corrosion resistance.

Cyclized natural rubber which, in individual chains, contains regions with fused hydroaromatic ring systems, cyclized polyisoprene and/or cyclized polybutadiene are generally favorable for use as component (a). Cyclorubber types having a molecular weight within a range of, for example, 5,000 to 70,000, preferably 6,500 to 45,000, or types having an iodine number of 50 to 200, preferably 60 to 150, are particularly suitable. Preferable cyclorubber types contain condensed phenol, the phenol content being up to 15, preferably 3 to 10, % by weight.

Examples of suitable polyfunctional amidoamines which can be used as component (b) are condensation products of monomeric unsaturated fatty acids having 12 to 18 carbon atoms but no conjugated double bonds or of their oligomers, for example linolenic acid, linoleic acid, oleic acid, palmitoleic acid, arachidonic acid or mixtures thereof, such as tall oil fatty acid or soybean oil fatty acid, and their possible isomers or of dimerized fatty acids of the abovementioned acids, having 12 to 18 carbon atoms, with polyalkylenepolyamines, for example aliphatic polyamines having 2 to 12, preferably up to 8, carbon atoms, such as ethylenediamine, diethylenetriamine, triethylenetetramine, propylenetriamine, dipropylenetriamine or tripropylenetetramine, or aromatic amines, such as diaminodiphenyl, diaminophenylamine, diaminophenylmethane or diaminophenylpropane, in each case singly or mixed. These unsaturated liquid to solid reactive polyamidoamines contain primary, secondary and/or tertiary amine groups but no conjugated double bonds. They can also have imidazoline structures, which are formed by elimination of water between an amino function and a carboxyl of the amide group as the condensation reaction continues. The amine content of component (b) can be controlled via the choice of the polyalkylenepolyamine for the condensation reaction. Preferable compounds contain, per g of polyamidoamine, 1 to 14 mmoles of amine groups which can be titrated with hydrochloric acid. The molecular weight, resilience, flexibility and degree of crosslinking of the end products can be controlled or matched with one another according to the use intended, through the amine content and the choice of the amine component or of the fatty acid component, on the one hand, and of the cyclorubber, on the other hand.

Component (c) is derived from partially blocked polyisocyanate compounds which have at least one free isocyanate group in the molecule. Blocking agents are in general straight-chain, branched or cyclic alcohols having up to 18, preferably up to 8, carbon atoms, such as butanol, hexanol, 2-ethylhexanol, cyclohexanol, ethylene glycol monoethyl ether or ethoxylation derivatives of ethylene glycol monoethyl ether including tertiary alcohols. Further, the isocyanates can also be blocked with other customary groups, such as phenols, lactams, for example ε-caprolactam, oximes and/or basic nitrogen compounds which have either tertiary nitrogen or blocked amine groups, such as Schiff bases, for example of aminoethanol and cyclohexanol or of primary amines and methyl ethyl ketone; or aminoalcohols, for example aminoethanol and/or aminopropanol. In these nitrogen compounds the amine group is blocked in order to prevent undesirable urea formation with the isocyanate group. The blocking agents are reacted with the polyisocyanates in a manner known per se, in general at temperatures below 100° C., if appropriate in the presence of an inert solvent and/or of a catalyst.

Possible polyisocyanates are the customary compounds, such as 2,4- or 2,6-toluylene diisocyanate, xylylene diisocyanate, diphenylmethane-4,4'-diisocyanate, triphenylmethyl 4,4',4"-triisocyanate, polyphenylpolymethyl isocyanate, isophorone diisocyanate, hexamethylene diisocyanate, 2,2,4(2,4,4)-trimethylhexamethylene diisocyanate, methylcyclohexyl diisocyanate, dicyclohexylmethyl diisocyanate, diethylfumarhexyl diisocyanate, bis-(3-methyl-4-isocyanatocyclohexyl)-methane, 2,2-bis-(4-isocyanatocyclohexyl)-propane, the methyl ester of lysine diisocyanate, the biuret of hexamethylene diisocyanate or even oligomeric diisocyanates, such as diisocyanates of dimeric acids, 1-methylbenzene-2,4,5-triisocyanate, biphenyl 2,4,4'-triisocyanate, triphenylmethanetriisocyanate, the triisocyanate of 3 moles of hexamethylene diisocyanate and 1 mole of water and which contains 16% of NCO, or further compounds containing at least two NCO groups per molecule.

The invention also relates to a process for preparing the binder according to the invention, in which an optionally phenol-containing cyclorubber (a) is first reacted with (b) a reactive polyamidoamine of an olefinic unsaturated monomeric fatty acid without conjugated double bonds or of its oligomers at elevated temperature, whereupon the reaction product thus obtained is further reacted at a temperature lower than in the 1st stage with a partially blocked polyisocyanate, which is preferably only blocked to such an extent that one free isocyanate group still remains in the molecule.

According to whether one starts from a low-molecular weight or high-molecular weight cyclorubber one obtains as desired an oligomeric end product or an end product with a higher molecular weight. Furthermore, the combination of higher amine functionality with a low fatty acid content can have the result that products are formed which have a low-molecular weight, and vice versa. The higher amine functionality, due to the associated more pronounced crosslinking, causes the hardened product to have increased chemical resistance and corrosion resistance.

The addition to the cyclorubber of a polydiene without conjugated double bonds in a proprtion of at most 40% by weight, relative to the total of cyclorubber and polydiene, before the reaction in the first stage, can impart to the binder, for example, increased plasticity or an elastomeric character and control the molecular weight distribution. Suitable for this purpose are polymers based on cyclopentadiene, methylcyclopentadiene or polybutadiene having a molecular weight of, in general, 1,000 to 50,000, preferably 1,500 to 10,000.

To control the plasticity it is however also possible to add the polydiene to the binder. In this case at most 60, in particular 20 to 40, % by weight, relative to the total of polydiene and cyclorubber incorporated in the binder, are added.

The weight ratio of component (a) to component (b) can vary, for example, within a ratio of 1:2 to 5:1, preferably 1:1.5 to 4:1. The type and amount of polyamidoamine is usually chosen in such a way that the reaction product of (a) and (b) contains, per g of resin, an amine functionality of about 3.5 to 0.5 mmoles of amino groups which can be titrated with hydrochloric acid. In some cases the amine functionality can also be above or below the range specified. As a rule the amine functionality will be adjusted in such a way that a neutralization equivalent favorable for the solubility in water is ensured. This means that depending on the amine content there is adequate water dilutability after neutralization in the neutral, acid or alkaline pH range.

Components (a) and (b) are reacted either in the melt or under concomitant use of an inert solvent, as a rule at temperatures of 140° to 300° C., preferably 160° to 280° C. Suitable solvents are in particular aprotic solvents, such as toluene, xylene, a mixture of aliphatic and/or aromatic hydrocarbons (boiling range: 160° to 210° C.), chlorobenzene or diethylene glycol methyl ether, in each case singly or mixed.

The reaction of the second stage is usually carried out in a conventional manner in the presence of an inert solvent and, if appropriate, of a catalyst. The temperature for the reaction in the second stage depends on the isocyanate used and is usually 0° to 120° C. Suitable solvents for this reaction are those mentioned above as well as ethers, such as mono-, di- and triethylene glycol dimethyl ethers, ethylene glycol monoethyl ether acetate, or ketones, such as isobutyl methyl ketone or butyl isobutyl ketone, in each case singly or, preferably, mixed, in particular mixtures of aromatic hydrocarbons with high-boiling ethers, in each case singly or mixed.

Examples of suitable catalysts are dibutyltin dilaurate, dibutyltin acetate and tin octoate. To characterize the reaction products obtained in the first stage from components (a) and (b) use is made of the RI value. This value indicates, in mmole/g, the number of groups in the reaction product which are still reactive with isocyanate groups. The RI value of the products can vary, for example, between 1.5 and 7, preferably 1.5 and 3. This range can occasionally also be exceeded or undershot. 30 to 70% of the groups represented by the RI value are usually reacted in the reaction in the second stage with polyisocyanate.

The RI value is determined as follows: the reaction product obtained in the first stage is dissolved in chlorobenzene, excess isocyanate is added, and the mixture is left at room temperature for 15 minutes. An excess of n-butylamine is then added, followed by a waiting period at room temperature of 15 minutes. Excess butylamine is titrated with 1N hydrochloric acid against bromophenol blue. The RI value is calculated from the difference between added and consumed butylamine.

Binders according to the invention have many uses, for example above all for preparing claddings and coatings on metal, wood, glass, ceramics, building materials or the like. The coatings can be applied by various means, for example by spreading, spraying or atomizing, if appropriate in the presence of a solvent or even in aqueous systems, for example dip coating, in particular by electrocoating, in particular cathodically.

In order to work with aqueous systems, the amine groups which remain in the reaction product obtained in the second stage after the reaction with the isocyanate are advantageously at least partially neutralized with organic and/or inorganic acids, such as formic acid, acetic acid, lactic acid, phosphoric acid or the like. The degree of neutralization depends in the particular case on the properties of the binder used. Given the right choice of components, binders according to the invention can be dissolved or emulsified in water even at a pH value of 5 to 8, preferably round the neutralization point.

For electrocoating, a binder concentration in the aqueous bath of 3 to 30, preferably 10 to 20, % by weight is advantageous. If appropriate, customary additives, such as pigments, fillers, surface-active agents and the like, can be added to the electrocoating bath.

After cathodic deposition the coating can in general be hardened at elevated temperature, for example at 130 to 200, preferably 150 to 180, °C., for example in the course of 5 to 30, preferably 10 to 25, minutes.

In the Examples which follow, parts, percentages, and ratios, are each relative to weight.

I. Preparing the cyclorubber adduct as precursor (A) 800 g of cyclorubber having an average molecular weight of 7,000, a phenol content of about 7.5%, and an iodine number of 74, were initially introduced jointly with 1,000 g of a polyamidoamine having an amine content of 6.6 mmoles per g into a reaction flask which is equipped with a stirrer, reflux condenser, inert gas supply and thermometer. The reaction mixture was heated to 260° C. in an inert gas, such as nitrogen, atmosphere, and stirred at this temperature for 16 hours. A product was obtained which had an amine content of 2.3 mmoles/g and an RI number of 4.9 mmoles/g. The viscosity of the product measured 2:1 in xylene was 560 mPa.s. A sample which had been neutralized with acetic acid was soluble in water.

(B) 1,250 g of a cyclorubber having an average molecular weight of 25,000, a phenol content of about 4.6%, and an iodine number of 90–95 were initially introduced jointly with 1,250 g of a polyamidoamine having an amine content of 6.6 mmoles/g into a reaction vessel of the same type as for product A. The reaction mixture was heated to 260° C. and stirred at this temperature for 19 hours. A product was obtained which had an amine content of 2.1 mmoles/g, an RI number of 4.6 mmoles/g, and a viscosity, measured 2:1 in xylene of 950 mPa.s. A sample which had been neutralized with acetic acid was soluble in water.

(C) In a reaction vessel of the type used in A, 666 g of a cyclorubber as in A were heated together with 333 g of a cyclopentadiene resin and 500 g of a polyamidoamine as in A to 275° C. in an atmosphere of inert gas, such as nitrogen, and kept at this temperature for 8 hours. A product was obtained which had an amine content of 1.5 mmoles/g, an RI number of 3.1 mmoles/g and a viscosity, measured 2:1 in xylene, of 3,986 mPa.s. Adding formic acid gave an aqueous emulsion.

(D) In a reaction vessel of the type used in A, 933 g of a cyclorubber as in A were heated together with 466 g of a polybutadiene oil having an average molecular weight of 1,500 and 560 g of a polyamidoamine (prepared from soybean fatty acid and diethylenetriamine and having an amine content (i.e. amine which can be titrated with HCL) of 4.9 mmoles/g) to 270° C. in an inert gas and stirred for 10 hours. A product was obtained which had an amine content of 1.23 mmoles/g, an RI number of 2.23 mmoles/g, and a viscosity, measured 1:1 in xylene, of 150mPa.s.

II. Examples 1. 100 g of adduct A were dissolved in 55 g of 3:1 ethylene glycol dimethyl ether/toluene. 32.8 g of a 60% strength solution of 2,4-toluylene diisocyonate blocked on one side with N,N-dimethylaminoethanol were metered in at 60° C., in the course of 90 minutes, and then 27.6 g of a 75% strength solution of 2,4-toluylene diisocyanate blocked on one side with ethylene glycol monoethyl ether were metered in at 60° C. in the course of 30 minutes. After a reaction time of 75 minutes, the reaction was complete. THe batch was cooled down to room temperature. After it had been neutralized with acetic acid it was diluted with distilled water to give a 15% strength solution. pH value of the solution: 6.9; conductivity: 1,500 μS.

2. 100 g of reaction product B were dissolved in 66 g of 3:1 ethylene glycol dimethyl ether/toluene. 70 g of a 60% strength solution in 3:1 ethylene glycol dimethyl ether/toluene of 2,4-toluylene diisocyanate blocked on one side with tert.-butanol were metered in at 20° C. in the course of one hour. The reaction mixture was then heated to 60° C. and allowed to react for 1 hour. After it had been neutralized with acetic acid the batch was diluted with distilled water to give a 15% strength solution. The pH value of the solution was 6.4, and its conductivity was 1,100 μS.

3. 150 g of adduct C were dissolved in 100 g of 3:1 ethylene glycol dimethyl ether/toluene. 29.5 g of a 60% strength solution in 3:1 ethylene glycol dimethyl ether/toluene of 2,4-toluylene diisocyanate blocked on one side with N,N-dimethylamioethanol were metered in at 60° C. in the course of 1 hour. 105 g of a 60% strength solution in the same solvent mixture of 2,4-toluylene diisocyanate blocked on one side with 2-ethylhexanol were then metered in in the course of 30 minutes. The reaction was complete after 90 minutes. The batch was cooled down to room temperature. 200 parts of this solution were neutralized with 12 g of 30% strength acetic acid, and the mixture was diluted with 588 g of distilled water. The pH value of the solution was 6.7, and it conductivity was 1,200 μS.

4. A 60% strength solution was prepared of 1,000 g of adduct D in 5:1 ethylene glycol dimethyl ether/aliphatic hydrocarbon mixture having a boiling range of 160° to 180° C. 244 g of a 60% strength solution in the same solvent of 2,4-toluylene diisocyanate blocked on one side with N,N-dimethylaminoethanol were metered in at 20° C. in the course of one hour. 256 g of a 60% strength solution in the same solvent mixture as above of 2,4-toluylene diisocyanate blocked on one side with ethylene glycol monoethyl ether were then metered in at 40° C. in the course of 1 hour. The reaction mixture was then allowed to react at 60° C. for a further 2 hours. The batch was then cooled down to room temperature.

III. Cataphoretic deposition of a cationic paint prepared according to Example 4

| Pigmentation | | |
|---|---|---|
| (a) Pigment paste: | | |
| Product of Example 4 | 420 | (252 parts solids content) |
| Acetic acid, 5N | 45 | |
| Butanol | 56 | |
| Deionized water | 300 | |
| Carbon black | 4.2 | |
| Aluminosilicate pigment | 46.2 | |
| Titanium dioxide | 420 | |

-continued

| | | |
|---|---|---|
| Lead silicate | 33.6 | |
| | 1,325 | | were dispersed in 10 minutes in a reaction vessel equipped with a high-speed stirrer, followed by two passes on a three-roll mill.

(b) Binder component:

| | | |
|---|---|---|
| Product of Example 4 | 979 | (587.4 parts solids content) |
| Acetic acid, 5N | 70 | |
| Deionised water | 600 | |
| | 1,649 | |

(c) Composition of the bath:

| | |
|---|---|
| Pigment paste | 1,325 |
| Binder component | 1,649 |
| Deionised water | 4,026 |
| | 7,000 |

Bath data:

| | |
|---|---|
| Solids content | 19.2% |
| pH value | 6.7 |
| Conductivity (at 25° C.) | 1,500 μS.cm$^{-1}$ |
| Sediment (after 24 hours) | none |

Cataphoretic deposition

| | | |
|---|---|---|
| Cathode: anode | material = | phosphatized steel metal |
| | ratio = | 1:1 |
| | distance = | 15 cm |
| Deposition time | = | 120 s |
| Deposition voltage | = | 350 volt |
| Baking conditions | = | 180° C./30 minutes |

Testing

| | |
|---|---|
| Film thickness | about 19 μm |
| Corrosion resistance in the salt spray test (ASTM B 117-64) exposure for 500 hours | |
| Cross cut | 0.5 mm |
| Edge | 0 mm |
| Degree of blistering (DIN 53,209) | M$_0$G$_0$ |
| Stone chippings test (according to VW Specification No. 3.14.3) | |
| damaged areas, visually characteristic values according to the VW scale* | about 2% 1 |

Throwing power (Ford box method, EU BI 20-2C)

| | |
|---|---|
| (a) visible | 225 mm |
| (b) 10 μm limit | 115 mm |
| (c) corrosion line | 160 mm |

*1 best value, 10 worst value

We claim:

1. A water-dilutable binder for coatings based on reaction products of diene polymers and polyunsaturated polyfunctional amidoamines, which comprises (a) a cyclorubber selected from the group consisting of cyclized natural rubber, cyclized polyisoprene and cyclized polybutadiene (b) a polyfunctional amidoamine which has been added to component (a) and is derived from the reaction of a monomeric unsaturated fatty acid free from conjugated double bonds having 12 to 18 carbon atoms or the oligomers of said fatty acid, with a polyalkylene polyamine selected from the group consisting of aliphatic polyamines having 2 to 12 carbon atoms and aromatic amines, said polyamidoamine containing primary, secondary and tertiary amine groups singly or mixed and (c) a partially blocked polyisocyanate which has at least one free isocyanate group in the molecule and whose isocyanate groups which are not blocked are bonded to component (b).

2. A binder as claimed in claim 1, wherein the cyclorubber (a) has iodine number of 50 to 250, or is a cyclorubber having a phenol content of up to 15% by weight, both having a molecular weight within a range of 5,000 to 70,000.

3. A binder as claimed in claim 1, wherein the polyfunctional amidoamine (b) is derived from tall oil fatty acid or from a dimerized fatty acid having originally 18 carbon atoms.

4. A binder as claimed in claim 1, wherein diisocyanate (c) is partially blocked with an aminoalcohol or a monohydric alcohol.

5. A binder as claimed in claim 1, which also contains a polydiene based on cyclopentadiene, methylcyclopentadiene or polybutadiene having a molecular weight of 1,000 to 50,000 which is free from conjugated double bonds and which reacted with component (a) in a proportion of at most 40% by weight or, together with component (a), is mixed in the binder in a proportion of at most 60, in particular 20 to 40, % by weight, relative to the total of polydiene and cyclorubber.

6. A process for preparing a binder as claimed in claim 1, wherein the cyclorubber (a) is first reacted with (b) the polyfunctional amidoamine at a temperature of from 140°–300° C. in the melt or under concomitant use of an inert solvent, whereupon the reaction product thus obtained is further reacted at a temperature of from 0° to 120° C. with a partially blocked polyisocyanate, which is advantageously blocked only to such an extent that at least one free isocyanate group is still contained in the molecule.

7. The process as claimed in claim 6, wherein component (a) is reacted with component (b) in a weight ratio of 1:2 to 5:1.

8. The process as claimed in claim 6, wherein 30 to 70% of the groups of the reaction product which is obtained in the 1st stage which react with isocyanate are reacted with polyisocyanate (c).

9. The process as claimed in claim 6, wherein a proportion of at most 40% by weight of a polydiene free from conjugated double bonds is added to the cyclorubber for the reaction in the first stage, the proportion being relative to the total of cyclorubber and polydiene.

10. Paints and coatings for electrocoating suitable for cataphoretic deposition obtained with the binder as claimed in claim 1 together with organic or inorganic acids or both, pigments, fillers, surface-active agents or other customary additives.

* * * * *